Figure 5:
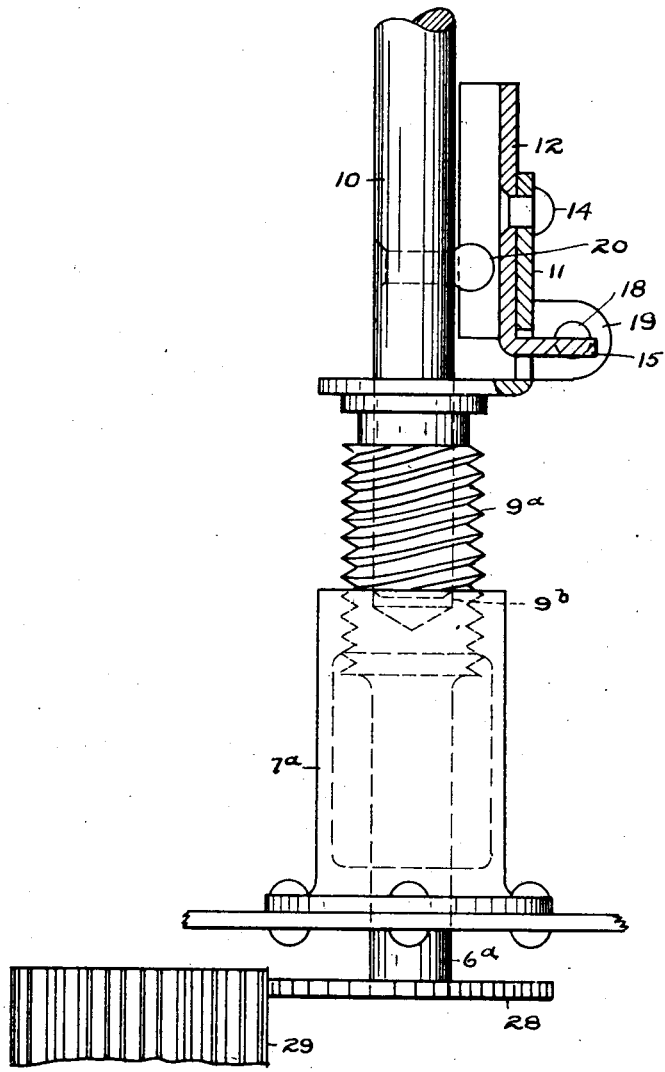

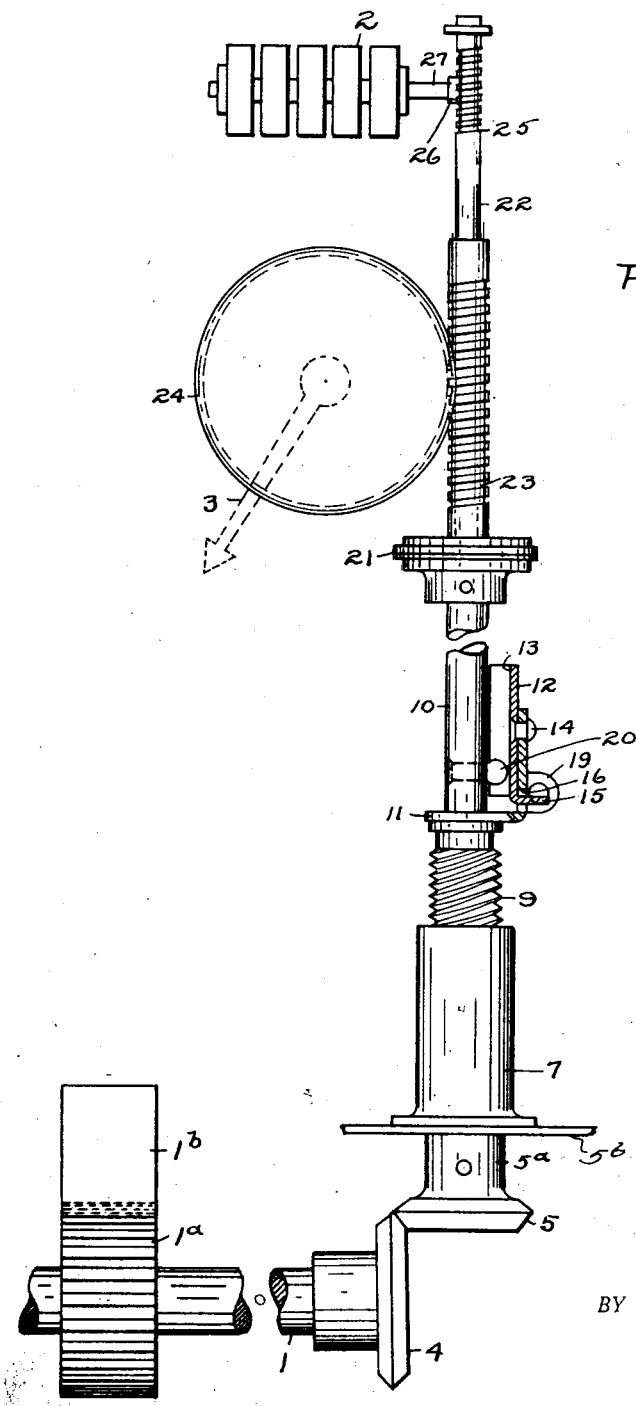

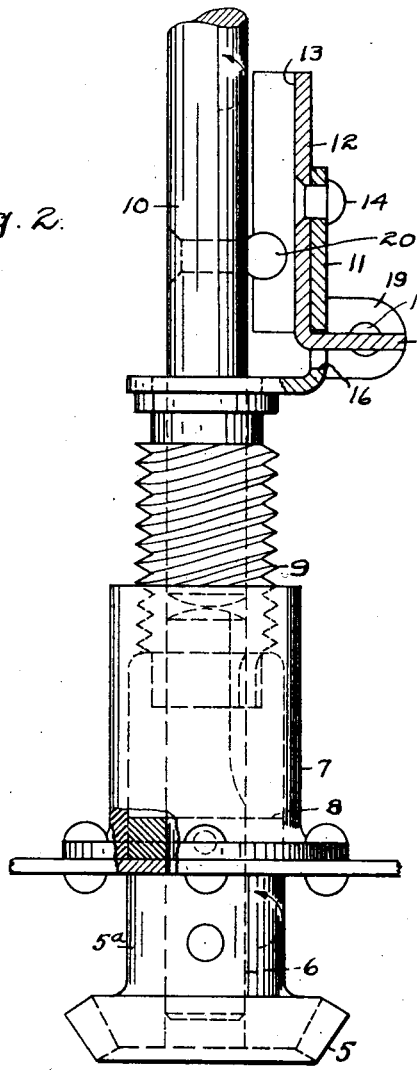
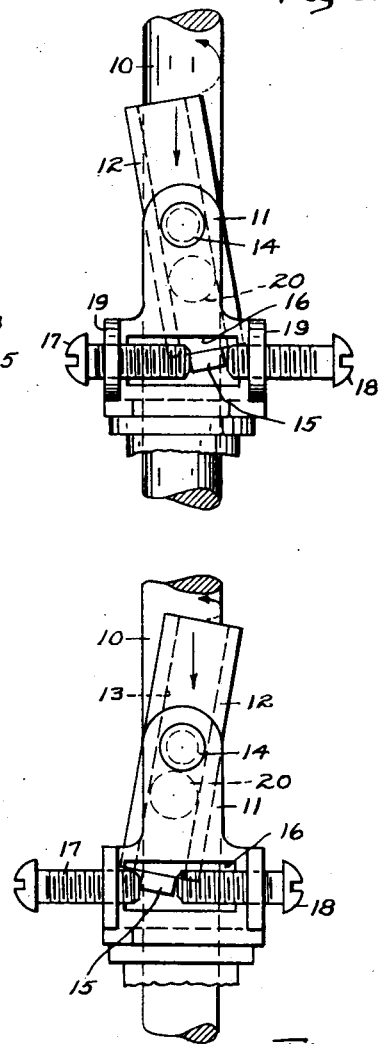

Patented June 11, 1929.

1,717,021

UNITED STATES PATENT OFFICE.

THOMAS CHATFIELD FISHER, OF FORT WAYNE, INDIANA, ASSIGNOR TO S. F. BOWSER & COMPANY, OF FORT WAYNE, INDIANA, A CORPORATION.

COMPENSATING MECHANISM.

Application filed January 22, 1926. Serial No. 83,026.

The invention relates to compensating mechanisms primarily for reciprocating dispensing pumps having a meter or registering mechanism.

In liquid dispensing pumps of the reciprocable type it is essential, because of slight difference in the castings and other parts of the mechanism which affect the measurement of the liquid, to adjust or vary the stroke of the piston to secure exact quantities of liquid, and where metering or registering devices are driven by the reciprocating piston mechanism it is essential, in order to secure accuracy of registration or indication of the quantity of liquid dispensed, to provide means by which variations in the pump mechanism may be compensated so that the driven mechanism will operate at a correct ratio relatively to the driving mechanism or in synchronism with the pump piston.

While the invention is applicable primarily to dispensing pumps it will be seen that it is applicable to many other types of mechanism, such as those wherein a shaft has a forward rotation and a return rotation and it it necessary that one end of the shaft shall rotate a constant amount of arc and the other end of the shaft shall rotate a variable amount of arc, so that the total rotation of one end of the shaft shall be somewhat in excess of or less than the total rotation of the other end, and this excess or diminution of rotation may need to be varied at times.

The object of the invention is to provide a simple means by which the above named requirements and advantages may be efficiently accomplished.

Another object is to provide a reciprocating dispensing pump with means by which uniform compensation is effected in metering or registering mechanism connected thereto throughout the delivery stroke of the pump.

The invention consists primarily in two revoluble shaft portions and means operatively connecting the two portions by which the arc of revolution or rotation of one of them may be increased or decreased relatively to the other.

The invention is illustrated in the accompanying drawings in which

Figure 1 is an elevational view of one form of the invention as applied to the meter or register of a dispensing pump; Fig. 2 an enlarged elevational view partly in section of the accompanying mechanism; Fig. 3 a front elevational view of the angle block and adjustment devices therefor; Fig. 4 another elevational view of the angle in an altered position and Fig. 5 a modified form of the invention.

In the embodiment of the invention illustrated in Fig. 1, 1 represents a shaft that is driven by a pinion 1ª thereon and the reciprocating rack 1ᵇ of a dispensing pump. Hence the shaft 1 is rotated in opposite directions as the rack reciprocates. 2 represents a meter and 3 a register that are to be operated by the shaft 1, and the said operation is accomplished by the mechanism and parts about to be described.

A bevel gear 4 is secured to the shaft 1 and meshes with a bevel gear 5 secured to the lower end of a shaft 6. The hub 5ª of the gear 5 abuts a fixed plate 5ᵇ to which plate a nut 7 is secured. The shaft 6 extends toward the opposite end of the nut. A collar 8 is pinned to the shaft 6 at the oposite side of the plate 5ᵇ and takes up the end thrust upon the shaft 6 of a screw or threaded collar 9 that is engaged in the internally threaded end of the nut 7, and also prevents outward longitudinal movement of the shaft 6. The collar 9 is also mounted on the shaft 10 and is keyed to the shaft 6 to rotate therewith and to move longitudinally thereon. The collar 9 is thus given a motion compounded of a rotation always equal to that of the shaft 6 and a certain amount of longitudinal movement.

An arm 11 is secured to the upper end of the collar 9 and projects laterally and upwardly therefrom, the upwardly extending portion of the arm preferably being parallel to the shaft 10 and spaced therefrom. A block 12 having therein a channel 13 of suitable shape and form is pivoted at 14 to the arm 11. A projection 15 on the block projects through a slot 16 formed in the arm 11 and is disposed between two adjusting screws 17 and 18 mounted in the lugs 19 that project outwardly from the arm 11. By adjusting the two screws 17 and 18 the angularity of the block with respect to the longitudinal axis of the shaft 10 is regulated as desired. Figs. 3 and 4 illustrate two opposite maximum positions of the block obtained by adjusting the screws 17 and 18.

A ball headed pin 20 is mounted in the shaft 10 and is slidably engaged by the block 12. The shaft 10, therefore, is driven by the shaft 6 by means of the pin 20, the block 12, the arm 11 and the collar 9. Since the collar engages the internal threads on the fixed nut, it will move either outwardly or inwardly relatively to the nut in accordance with the direction of rotation of the shaft 6. If the block 12 is alined with the shaft 10 the latter shaft will be driven at the same speed as the shaft 6. Assuming that the shaft 6 at the discharge stroke of the pump is being driven in the direction of the arrow on the hub 5ª of the gear 5 (Fig. 2) and that the block 12 has been swung on its pivot to the position shown in Fig. 3, the collar 9 will move into the nut 7 and cause the block to move endwise along with it. Since the pin 20 is engaged by the angularly disposed block 12 and it is secured to the shaft 10, the latter shaft will be caused to rotate in the same direction as shaft 6 but at a more rapid rate. When the block is shifted in the opposite direction, as shown in Fig. 4, the shaft 10 will be rotated at a slower rate than the shaft 6. By adjusting the screws 17 and 18 any intermediate speed may be imparted to the shaft 10 between each of the two extremes of speed above described.

In Fig. 1 the shaft 10 operates the driving mechanism for the meter 2 and discharge register 3. A roller ratchet mechanism 21 is attached to the upper end of the shaft 10. The mechanism is operatively connected to a shaft 22 upon which the worm 23 is formed. This worm 23 meshes with a worm gear 24 which drives the pointer or register 3 that cooperates with a graduated scale (not shown) indicating gallons and also fractions of gallons if desirable. A worm 25 is also attached to or integral with the shaft 22 and meshes with a worm gear 26 attached to or formed on the shaft 27 of the meter mechanism 2. The roller ratchet mechanism drives the worm shaft 22 in one direction only, and permits the compensating mechanism to rotate backwards without affecting the shaft 22.

The several gear ratios are predetermined for the specific use of the compensating mechanism. As an example, where the pump mechanism is designed to discharge five gallons of liquid at each discharge stroke and the register 3 is designed to indicate up to 20 gallons. The ratio of the gears 4 and 5 is 3.2 to 5 so that for each five gallon stroke of the pump mechanism the shaft 1 rotates 3.2 revolutions. The ratio of the worm 23 and the gear 24 is 20 to 1 and the ratio of the worm 25 and the gear 26 is 10 to 1. If the pump mechanism is accurate in its construction the meter and register should indicate five gallons at the completion of each discharge stroke of the mechanism, but that ideal is frequently not reached and to compensate the gain or loss in the delivery of the liquid the compensating mechanism is adjusted at the screws 17 and 18 until the meter and register indicate the exact quantity of liquid discharged at each discharge stroke of the pump. That is, if the stroke of the pump in delivering five gallons of liquid is longer than normal the block 12 will be adjusted to decrease the speed of the shaft 10 so that the meter and register will indicate five gallons when the quantity is actually discharged and when the stroke is less than normal the block 12 will be adjusted to increase the speed of the shaft 10. In this manner the meter and discharge register may be caused to indicate exactly the quantity of liquid discharged at each discharge stroke of the pump mechanism.

The downward or return stroke of the pump mechanism merely rotates the compensating mechanism backwards while the worm shaft 22 remains at rest. The compensating mechanism may be applied to various styles and capacities of pump mechanism and to various other mechanisms and uses, and either shaft 6 or 10 may be the driven shaft and the other the shaft that drives the particular mechanism operatively connected to it.

Various other means may be used to drive the shaft 10, a modified form being illustrated in Fig. 5 in which the threaded collar or screw 9 and the shaft 6 have been replaced by a shaft 6ª upon which are formed the external threads 9ª, the shaft 10 extending freely into a bore 9ᵇ in the end of the shaft 6ª. The nut 7ª is similar to the nut 7 except as to the size of the bearing therein for the shaft 6ª. A gear 28 is secured to the shaft 6ª and meshes in a relatively wide gear 29 that is suitably connected to the prime mover or to the part to be rotated. Since the gear 29 is relatively wide the gear 28 may move across its periphery without disengagement. In this modification the screw 9ª is rotated and moves in and out of the nut 7ª, shaft 10 being in longitudinal alinement with the shaft 6ª as in the case of shafts 6 and 10 before described.

What I claim is:

1. A compensating coupling for driving and driven devices including a driving shaft, an externally threaded collar splined on said shaft, a fixed nut wherein said collar rotates, a driven shaft alined with the driving shaft, an adjustable cam member supported by the collar, means to engage the cam member and adjust the position thereof, and a driving lug projecting from the driven shaft and engaging said cam member.

2. A compensating coupling for driving and driven devices including a driving shaft, an externally threaded collar splined on said shaft, a fixed nut wherein said collar rotates, a driven shaft alined with the driving shaft, a bracket fixed to said collar and having an arm extending parallel to the driven shaft, a cam channel pivoted on said arm to swing into and out of parallelism with the driven shaft on a pivotal axis radial of the shaft, a driving lug projecting from the driven shaft into said channel, and means to adjust the position of said channel on its pivot and hold it in adjusted position.

3. A compensating coupling for driving and driven devices including a driving shaft, an externally threaded collar splined on said shaft, a fixed nut wherein said collar rotates, a driven shaft alined with the driving shaft, a bracket fixed to said collar and having an arm extending parallel to the driven shaft, a cam channel pivoted on said arm to swing into and out of parallelism with the driven shaft on a pivotal axis radial of the shaft, a driving lug projecting from the driven shaft into said channel, a pair of ears on said bracket on opposite sides of the channel member, and opposed adjusting screws screwed through said ears and engaging the channel in opposition to each other.

In witness whereof I have hereunto set my hand this 30th day of November, 1925.

THOMAS CHATFIELD FISHER.